Oct. 9, 1945.   H. A. WAGNER ET AL   2,386,519
MATERIAL HANDLING TRUCK
Filed Dec. 6, 1943   2 Sheets-Sheet 1

Harold A. Wagner
Gustave H. Wagner
INVENTORS

BY *E. A. Burkhum*
Attorney

Oct. 9, 1945.   H. A. WAGNER ET AL   2,386,519
MATERIAL HANDLING TRUCK
Filed Dec. 6, 1943   2 Sheets-Sheet 2
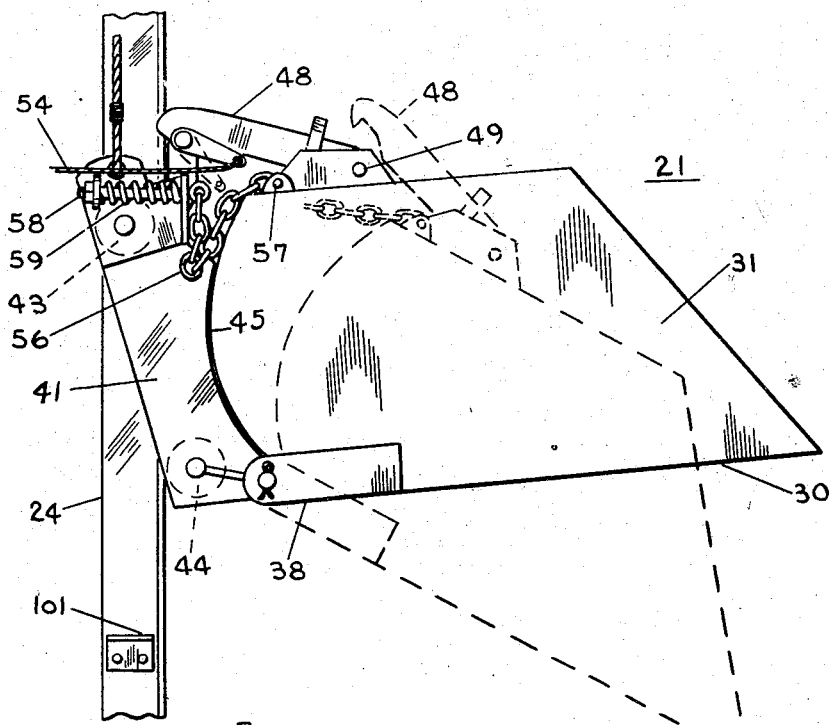
Harold A. Wagner
Gustave H. Wagner
INVENTORS
BY *E. A. Buchan*
Attorney Patented Oct. 9, 1945

2,386,519

UNITED STATES PATENT OFFICE 2,386,519

MATERIAL HANDLING TRUCK

Harold A. Wagner and Gustave H. Wagner, Portland, Oreg.

Application December 6, 1943, Serial No. 513,160

2 Claims. (Cl. 214—113)

The present invention relates to material handling apparatus and, more particularly, to vehicle devices for handling bulk material.

Bulk material, such as coal, sand, dirt, snow or the like, is frequently required to be picked up from the ground and moved to another location or loaded onto a truck for hauling. Crane type power shovels or clam buckets are frequently used for handling such bulk material but the latter types of apparatus are relatively cumbersome, unwieldy, slow and not sufficiently mobile to render them practicable for handling relatively small quantities, or where rapid mobility of the handling means is required. Due to the present lack of a more suitable apparatus for this type of work, hand labor, or shovel gangs, are frequently resorted to with resultant high handling costs.

It is a general object of the present invention, therefore, to provide a new and improved vehicle apparatus for handling loose, bulk material.

A further object of the invention is to provide a new and improved utility truck vehicle which is particularly suitable for scooping bulk material from the ground and loading it into an elevated receptacle, such as a dump truck body.

Another object is to provide a new and improved scoop arrangement for a bulk material handling vehicle.

A still further object is to provide a novel bulk material handling truck which is highly maneuverable, relatively light in weight, simple in design, and low in manufacturing costs.

In accordance with the illustrated embodiment, the material handling truck comprises a relatively light weight vehicle having a rigid upright structure fastened onto the front end thereof. A scoop is provided upon the upright, it being supported upon a carriage which is arranged for vertical movement upon the upright. The scoop is pivotally mounted upon the carriage and is normally retained in a substantially horizontal position, except when it is desired to unload the scoop when it is caused to tilt to a dumping position. Raising and lowering of the carriage and scoop upon the upright structure is controlled through means operatively coupling the carriage to the prime mover engine of the vehicle.

Figure 1:
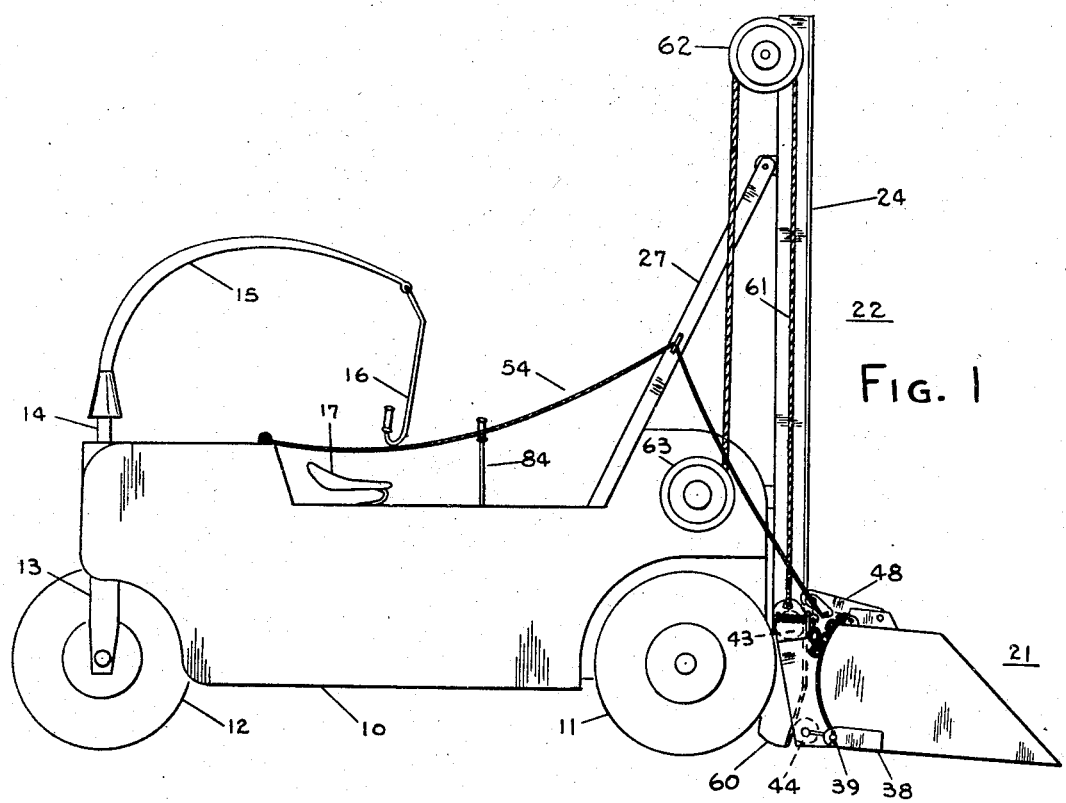
Figure 2:
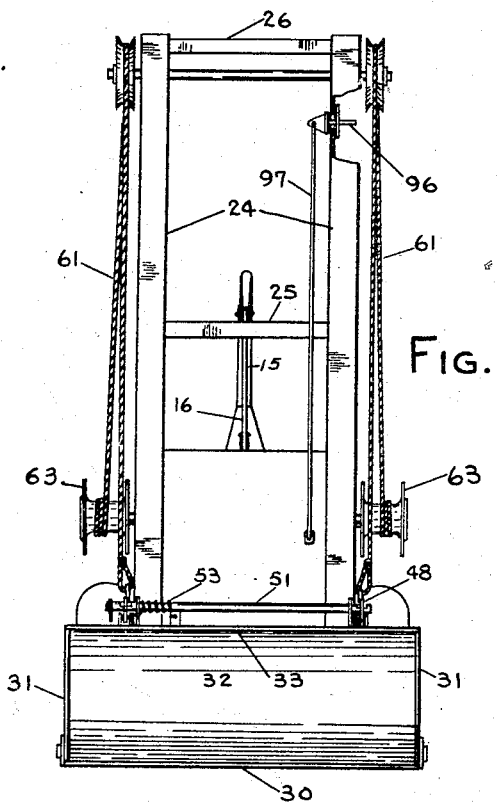
Figure 3:
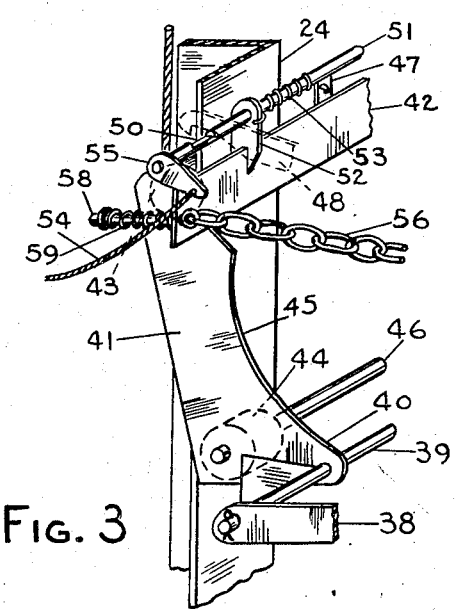

In the drawings Fig. 1 is a side elevation of the apparatus of the invention constructed in accordance with one form thereof; Fig. 2 is a front elevation of the apparatus as shown in Fig. 1; Fig. 3 is a fragmentary view illustrating certain details of the scoop carriage structure; Fig. 4 is a fragmentary detail view illustrating the scoop in a partially elevated position upon the upright structure of the vehicle; and Fig. 5 is a diagrammatic sketch illustrating the driving and control arrangement for the scoop assembly.

Referring particularly to Figs. 1 and 2 of the drawings, a vehicle is illustrated including a body frame 10 having a pair of relatively widely spaced front wheels 11 which are adapted to be driven by the engine (not shown) mounted within the body 10. The rear end of the vehicle is supported by a single wheel 12 mounted upon a yoke member 13 having a post 14 which is suitably journaled within the end of the body 10 for movement about a vertical axis. A tiller arm 15 secured to the upper end of the post 14 is provided with a convenient handle 16 extending forwardly of the operator's seat 17 and by means of which steering movement of the wheel 12 may be effected.

A bulk material handling means, such as a scoop, indicated generally at 21, is arranged upon the forward end of the vehicle, the scoop being supported within a carriage and which, in turn, is mounted for vertical movement upon an upright structure 22 fixedly secured to the forward end of the vehicle body. The upright structure may be of any suitable construction defining a pair of parallel guides for the rollers of the carriage. The upright structure as illustrated comprises a pair of spaced apart parallel angle members 24 so arranged that one of their flanges face forwardly in a common plane and extend away from each other. The angle members 24 may be of any desired height and are rigidly secured adjacent their lower ends to the vehicle frame 10. The angle members 24 are braced with respect to each other by cross members 25 and 26 extending therebetween above the vehicle and the upper end of the upright structure is braced to the upper portion of the vehicle body 10 by angularly extending braces 27.

The scoop 21 is of a width somewhat greater than the overall width of the front wheels 11, for reasons as will be explained more fully hereinafter, and comprises a base portion 30, opposite side walls 31, a curved rear wall 32 and an upper wall 33 extending over the rearmost portion only of the scoop.

The scoop is pivotally mounted upon the carriage structure for movement between a generally horizontal position and a tilted or dumping position. Rigidly secured as by welding to the lower rear corners of the scoop are a pair of rearwardly extending bracket arms 38 which are loosely journaled upon the ends of a transversely extending shaft 39 of the supporting carriage. Referring particularly to the fragmentary view of Fig. 3, which illustrates one side of the carriage structure, the rod 39 is rigidly welded to the forwardly extending portions 40 of the side members 41, the upper ends of the side members being rigidly secured relative to each other by the cross bar 42. A pair of rollers indicated at 43 and 44 are rotatably mounted upon the side members, the upper rollers 43 being arranged for riding upon the rear surfaces of the forward flanges of the upright angles 24 while the lower rollers 44 are adapted for riding upon the front surfaces of these flanges. The shaft 46 upon which the lower rollers 44 are supported extends between the side frame members 41 as indicated.

The scoop is normally restrained against pivotal movement about the shaft 39 by a pair of latch hooks 48 pivotally secured as by pins 49 to lugs welded to the upper wall portion 33 of the scoop. The ends of the hooks 48 are adapted to engage behind cooperating shoulders formed by flattened portions 50 on the latch control shaft 51. The shaft 51 is rotatably supported by brackets 52 secured to the cross bar 42 and is biased in the counter-clockwise direction of rotation as viewed in Figs. 1 and 3 by means of a suitably arranged spring 53. A stop 47 secured to the shaft 51 limits the rotation of the shaft under the torque of the spring. Release of the latches 48 may be effected by rotating the shaft 51, such as by means of a rope 54 secured to the end of a lever arm 55 fixed on the end of the shaft 51. By turning the shaft 51 in the clockwise direction the latches will be released from the shoulders 50 whereupon the scoop will be freed for tilting to the dumping position illustrated by dotted line in Fig. 4. Forward tilting movement of the scoop is restricted by means of a pair of chains 56 secured at one end as at 57 to the upper portion of the scoop, the other end of the chains extending through an eye of an eye bolt 58 arranged through a cooperating opening in the end of the cross bar 42. Arranged around the eye bolt behind the cross bar is a spring 59 for resiliently arresting the scoop in the predetermined tilted position. Th scoop is automatically reset to the latched-in horizontal position upon lowering of the carriage and engagement of the scoop with the ground whereupon the latches 48 will automatically hook behind the squared shoulders 50 on the control shaft 51 of th carriage.

As illustrated in Fig. 1, the lowermost ends 60 of the angle members 24 of the upright structure are deformed slightly rearwardly so that as the scoop carriage is dropped to the lowermost position, the foremost edge of the scoop 21 is directed at a slight downward angle from a true horizontal for the purpose of bringing the front edge of the scoop into engagement with the ground for facilitating the picking up of bulk material from the ground ahead of the vehicle. As previously pointed out, the scoop is slightly wider than the overall width of the front wheels so that the scoop clears the path ahead of the wheels 11 to provide a firm traction therefor upon the surface of the ground therebeneath. The scoop is filled by simply driving the vehicle with the scoop in the lowered position as shown in Figs. 1 and 2 into a pile of bulk material lying upon the ground. After the scoop is filled it is raised by means of a pair of cables 61 connected at one end to the opposite sides of the scoop carriage, the cables extending upwardly over pulleys 62 rotatably mounted on the upper ends of the upright members 24 from which the cables extend downwardly to the winch drums 63 arranged on each of the opposite sides of the vehicle. As the scoop carriage is raised upwardly and the lower roller 44 passes above the rearwardly bent lower ends of the upright members 24, the front end of the scoop 21 is tilted upwardly at a slight angle above the horizontal as illustrated in full line in Fig. 4 to minimize the spilling of material from the scoop as the vehicle is backed away from the pile. For transporting the scoopful of material to the desired place for dumping, it is preferred to raise it to a position only a few feet above the ground so that the center of gravity of the load will be maintained reasonably low. When it is desired to dump the load from the scoop the latches 48 may be released to permit forward and downward pivotal movement of the scoop to the dotted line position as shown in Fig. 4. If it is desired to dump the material into an elevated hopper or into a dump truck body, the scoop may be raised to a point high on the upright structure and the vehicle driven forwardly so that the foremost edge of the scoop overhangs the side wall of the receptacle before the latches 48 are released.

The mechanism for driving the cable winch drums 63 from the prime mover engine of the vehicle may be of any suitable form, such as that illustrated diagrammatically in Fig. 5. Referring to this figure, 70 indicates the prime mover engine mounted within the vehicle body, the drive shaft of which is operatively coupled by a chain 71 to a drive shaft 72. Arranged on the drive shaft 72 is a clutch comprising an axially adjustable driving element 73 and a driven element 74, the driven element being affixed to the driven shaft 75 which is coupled by a chain 76 to a shaft 77 extending from a differential gear housing 78. The winch drums 63 may be mounted on the outer ends of shafts 79 extending transversely of the vehicle from the opposite sides of the differential 78. By driving the winch drums through a differential gearing equalized loading of the cables 61 may be maintained. Arranged about the driven clutch element 74 is a brake drum 81 surrounded by a brake band 82 which is normally biased to the set position by a suitable spring 83. The brake and clutch may be suitably controlled by a single manual control lever 84 pivotally mounted as at 85 onto the vehicle body. The lower end of the lever 84 may be connected by rod 86 to a clutch operating lever 87. Connected to the lever 84 above the pivot 85 is a rod 88 having a sleeve 89 affixed thereto and which is slidably arranged over the end of a second rod 91, the opposite end of rod 91 being connected by a bell crank 92 to the brake band 82. Movement of the manual operating lever 84 from the neutral position toward the left, as viewed in Fig. 5, will effect engagement of the clutch elements 73—74. The brake band 82 extends around the drum 81 in such a direction that the brake band will offer very slight resistance to the rotation of the drum 81 during forward driving thereof. Reverse movement of the brake drum 81, upon disengagement of the clutch, will be effectively prevented by the brake band under the tension of the spring 83. Movement of the lever 84 toward the right, as viewed in Fig. 5, will cause the end of the sleeve 89 to engage with the stop 95 on the rod 91 to effect movement of the bell crank 92 and loosening of the brake band 82 against the tension of spring 83. Loosening of the brake band 82 when the scoop is in the elevated position will permit the descent of the scoop to the lowered position upon the upright.

For limiting the upward travel of the scoop carriage upon the upright, means are provided for automatically effecting disengagement of the clutch upon the carriage reaching a predetermined upper position. As shown clearly in Fig. 2, a stop 96 is slidably arranged within a slot through the rearwardly extending flange of one of the angle upright members and which stop is connected by a rod 97 to one end of a bell crank 98 as shown in Fig. 5, the other end of the bell crank being connected by a rod 99 to the clutch control lever 87. Upon movement of the carriage to an upper limit position the upper roller 43 of the carriage engaging with the stop 96 will carry it upwardly thereby rotating the bell crank 98 and causing movement of the rod 99 and clutch control lever 87 to the disengaged position. Movement of the carriage is arrested in the lowermost position by engagement of the rollers 44 with fixed stops 101 suitably secured to the angle members 24.

Referring particularly to the view of Fig. 1, it will be observed that the lower rollers 44 of the carriage and the pivotal support 39 of the scoop are arranged substantially in line with the bottom of the scoop so that as the scoop is driven into a pile of bulk material, such as coal or earth, the driving force of the vehicle is transmitted substantially in a straight line from the lower ends of the upright members to the front edge of the scoop. It will be noted that the shaft 46 for the lower rollers 44 extends the full distance between the side frame members 41 so as to provide a strong support for the lower rollers which are subjected to a heavy thrust in the scooping up of loads. In order further to provide a firm backing for the scoop as it is being driven into a pile of bulk material, the forward edge 45 of the side frame members 41 is so shaped as cooperatively to engage with the curved rear wall 32 of the scoop when the latter is in the horizontal position.

It is preferred that the guide frame members 24 of the upright structure for the scoop carriage be spaced widely apart in order that when driving the scoop into a pile of bulk material in an off centered relation with respect to such pile, the effect of the unbalanced stress upon the carriage and upright structure will be minimized.

It will be obvious that the scoop may be of any desired capacity and size, depending upon the nature of the material intended to be handled thereby. For handling a relatively dense material, such as sand or coal, a smaller sized scoop may be provided than if a less dense material, such as snow or the like, is to be handled. It will also be obvious that the scoop may be removably attached to the carriage structure so that scoops of the most appropriate size may be attached in place as the particular job may require.

The vehicle 10 may be of a relatively small, compact size, and of relatively light weight so as to enhance its maneuverability within confined areas of operation. The wheels 11 and 12 are preferably of relatively large diameter so that the vehicle may be operated over relatively rough ground.

Having described the principle of the invention in what is considered to be a preferred embodiment thereof, it is desired that it be understood that the specific details shown are merely illustrative in that the invention may be carried out in other ways.

We claim:

1. A bulk material handling apparatus comprising a vehicle including a frame, an upright secured to the forward end of said frame, a scoop, a carriage pivotally supporting said scoop mounted upon said upright for vertical movement with respect thereto, the pivotal axis for said scoop on said carriage being rearward of the center of gravity of said scoop whereby said scoop is normally unbalanced toward a dumping position, a rotatably mounted shaft extending transversely of said carriage and having a squared shoulder formed thereon, stop means limiting rotation of said shaft in one direction, spring means biasing said shaft to the limit position in said one direction, pivoted hook means secured to the upper portion of said scoop for cooperatively engaging said shoulder for retaining said scoop in a substantially horizontal position, and means for rotating said shaft against said spring biasing means for causing disengagement of said hook means from said shoulder.

2. A material handling truck, an upright secured to the forward end of said truck, a material receiver, a carriage pivotally supporting said receiver mounted upon said upright for vertical movement with respect thereto, the pivotal axis for said receiver on said carriage being rearward of the center of gravity of said receiver whereby said receiver is normally unbalanced forwardly toward a dumping position, a shaft rotatably mounted upon said carriage and extending transversely thereof adjacent the upper portion of said receiver, said shaft having a squared shoulder formed thereon, a hook means pivotally secured to the upper portion of said receiver for cooperatively engaging said shoulder for normally retaining said receiver in a substantially horizontal position, said shaft being rotatable in one direction from a predetermined set position for causing disengagement of said hook means from said shoulder to permit movement of said receiver to the dumping position, means for rotating said shaft in said one direction, and spring means for returning said shaft to said set position.

HAROLD A. WAGNER.
GUSTAVE H. WAGNER.